United States Patent
Puskorius et al.

Patent Number: 5,699,253
Date of Patent: Dec. 16, 1997

[54] NONLINEAR DYNAMIC TRANSFORM FOR CORRECTION OF CRANKSHAFT ACCELERATION HAVING TORSIONAL OSCILLATIONS

[75] Inventors: Gintaras Vincent Puskorius, Redford; Lee Albert Feldkamp, Plymouth, both of Mich.

[73] Assignee: Ford Global Technologies, Inc., Dearborn, Mich.

[21] Appl. No.: 417,361

[22] Filed: Apr. 5, 1995

[51] Int. Cl.$^6$ ............................ G06F 19/00; G01L 23/22
[52] U.S. Cl. ........................ 364/431.08; 364/431.07; 73/117.3; 73/116; 123/419
[58] Field of Search ............. 364/431.03, 431.08, 364/431.07; 123/419, 416; 73/117.3, 116

[56] References Cited

U.S. PATENT DOCUMENTS

| | | | |
|---|---|---|---|
| 4,494,509 | 1/1985 | Long | 123/416 |
| 5,041,976 | 8/1991 | Marko et al. | 364/424.03 |
| 5,056,360 | 10/1991 | Dosdall et al. | 73/116 |
| 5,117,681 | 6/1992 | Dosdall et al. | 73/116 |
| 5,193,513 | 3/1993 | Marko et al. | 125/571 |
| 5,269,178 | 12/1993 | Vigmostad et al. | 73/116 |
| 5,313,407 | 5/1994 | Tiernan et al. | 364/508 |
| 5,313,826 | 5/1994 | Klauber et al. | 73/118.1 |
| 5,359,518 | 10/1994 | Wimmer | 364/431.03 |
| 5,361,213 | 11/1994 | Fujieda et al. | 364/431.08 |
| 5,377,537 | 1/1995 | James | 73/117.3 |
| 5,379,634 | 1/1995 | Kuroda et al. | 73/116 |
| 5,452,604 | 9/1995 | Namiki et al. | 73/116 |
| 5,495,415 | 2/1996 | Ribbens et al. | 364/431.03 |
| 5,497,328 | 3/1996 | Sugai et al. | 364/431.03 |

OTHER PUBLICATIONS

IEEE Transactions of Neural Networks, vol. 5, No. 2, Mar. 1994, pp. 279–297.
Proceedings of the 1994 IEEE International Conference on Neural Networks, Orlando 1994, pp. 2488–2493.
Proceedings of the 33rd IEEE Conference on Decision and Control, Orlando 1994, pp. 2754–2759.

*Primary Examiner*—Kevin J. Teska
*Assistant Examiner*—Tan Nguyen
*Attorney, Agent, or Firm*—Mark Mollon

[57] ABSTRACT

Irregularities in crankshaft velocity introduced when measuring crankshaft rotation at a section of a crankshaft in an internal combustion engine that is less damped to torsional oscillations than is another more accessible crankshaft section are corrected by performing a nonlinear transformation via a neural network to predict rotation measurements that would have been obtained at the inaccessible section from data actually collected at the accessible crankshaft section. Thus, the effects of torsional oscillations in the crankshaft are substantially filtered away, resulting in crankshaft acceleration values that form the basis of a misfire detector having nearly maximum signal-to-noise performance.

8 Claims, 7 Drawing Sheets

NONLINEAR DYNAMIC TRANSFORM FOR CORRECTION OF CRANKSHAFT ACCELERATION HAVING TORSIONAL OSCILLATIONS

BACKGROUND OF THE INVENTION

The present invention relates in general to misfire detection in internal combustion engines, and more specifically to a system and method that corrects for irregularities in measured crankshaft velocity introduced when measuring crankshaft rotation at a section of the crankshaft that is less damped to torsional oscillations than is another crankshaft section.

In crankshaft based misfire detection methods, the failure of one or more cylinders to produce power during its respective power stroke is detected by sensing very small changes in the velocity (and thus acceleration) of the engine crankshaft. Since the velocity during each velocity measuring interval of engine rotation is determined according to the rotational arc $\Delta\theta$ covered by the interval divided by the time $\Delta T$ required to pass through the arc, the measured values for both $\Delta\theta$ and $\Delta T$ must be measured sufficiently accurately to provide the sensitivity required to detect such small velocity changes.

Crankshaft based misfire detection methods are discussed in U.S. Pat. No. 5,044,194, U.S. Pat. No. 5,056,360, and U.S. Pat. No. 5,109,695, all hereby incorporated by reference. Such methods perform well under certain engine operating conditions. However, at certain combinations of engine speed and engine load, the accuracy of crankshaft based misfire detection methods typically decreases. For example, with an engine operating at high speed and low load, systematic irregularities in the measured crankshaft velocity interfere with reliable detection of misfires or proper firings of individual cylinders.

A significant source of such irregularity is position errors in determining the rotational arcs during each measuring interval. Engine rotational position is monitored using a rotor having vanes, teeth, or slots disposed thereon for interacting with magnetic or optical sensors at predetermined points in the rotation of the engine crankshaft. One source of position error results from the rotor wheel profile. During manufacture of a wheel, errors occur between the desired and actual positions for position markers on the wheel. Any deviation of the actual angle $\Delta\theta$ from the assumed value results in velocity and acceleration errors. This type of position error is discussed in U.S. Pat. No. 5,117,681, which is incorporated herein by reference. Another source of measurement irregularity is the torsional flexing of the crankshaft during engine operation. The crankshaft is an extended shaft constructed of metal which is not completely rigid and thus flexes as it is driven by the engine cylinder firings. A crankshaft typically is connected to a flywheel of large mass near the back of an engine and extends through the front of the engine for access by auxiliary components. The torsional flexing along the crankshaft creates oscillations in the sensed crankshaft rotation intervals. These oscillations again lead to irregularities in the resulting velocities and accelerations, possibly causing inaccuracies in the misfire detection.

A method for dynamically obtaining correction factors to remove these irregularities is disclosed in copending application Ser. No. 08/417,357, now U.S. Pat. No. 5,531,108, "Adaptive Correction of Torsional and Wheel Profile Position Errors for Misfire Detection", which is incorporated herein by reference.

Applicants have found that the signal-to-noise ratio in a crankshaft-based misfire detector is related to the position along the axial length of the crankshaft where crankshaft rotation is sensed. More specifically, some sections of the crankshaft are more damped to torsional oscillations than others, such as sections having greatest mass (for example, the flywheel). Measuring rotation at the highly damped sections results in more accurate results than measuring at other crankshaft sections because the amount of correction needed is less and because the oscillations there are more periodic in nature. Thus, rotation measurements would most ideally be made at the massive flywheel or other massive section of the crankshaft to provide the greatest range of misfire detection accuracy over all speed and load conditions of the engine. However, the flywheel is typically mounted at the rear of an engine where it may be inconvenient for mounting a position sensor.

In addition to misfire detection, crankshaft position is also measured for controlling spark timing and dwell in the ignition system. A crankshaft position sensor for the ignition system is typically mounted at the front of the crankshaft which extends through the front of the engine. The front section of the crankshaft is remote from the most massive sections of the crankshaft and is thus more susceptible to torsional oscillations. Position accuracy is not nearly as critical for an ignition system as it is for a misfire detection system, so torsional oscillations are not a problem. However, it may be desirable to use a single position sensor for both ignition control and misfire detection, and a sensor location at the front of the crankshaft is desirable for its convenience and lower cost than a sensor mounted at other sections of the crankshaft.

SUMMARY OF THE INVENTION

The present invention has the advantage that misfire detection accuracy nearly as good as that obtained with crankshaft rotation measurements taken at the flywheel is obtained using only crankshaft rotation measurements taken at the front of the crankshaft.

The inventive method obtains corrected rotation quantities in a misfire detector for an internal combustion engine having a crankshaft with a first crankshaft section which is damped with respect to torsional oscillations. The engine has a crankshaft position sensor generating position signals at predetermined rotational positions of the crankshaft. The crankshaft position sensor is juxtaposed with a second crankshaft section where torsional oscillations have a greater magnitude than at the first crankshaft section. Rotation quantities corresponding to individual cylinder events during operation of the engine are measured. The measured rotation quantities are corrected to remove periodic position errors. A nonlinear transform is applied to the corrected measured rotation quantities to estimate acceleration values occurring at the first crankshaft position. Finally, misfire is detected using the estimated rotation quantities. A trained neural network may provide the dynamic, nonlinear transform that specifies acceleration at the damped crankshaft section based on measurements taken at the relatively less damped crankshaft section.

BRIEF DESCRIPTION OF THE DRAWINGS

FIGS. 9A to FIG. 12B plot acceleration values determined with and without the method of the present invention.

DETAILED DESCRIPTION OF PREFERRED EMBODIMENTS

Figure 1:
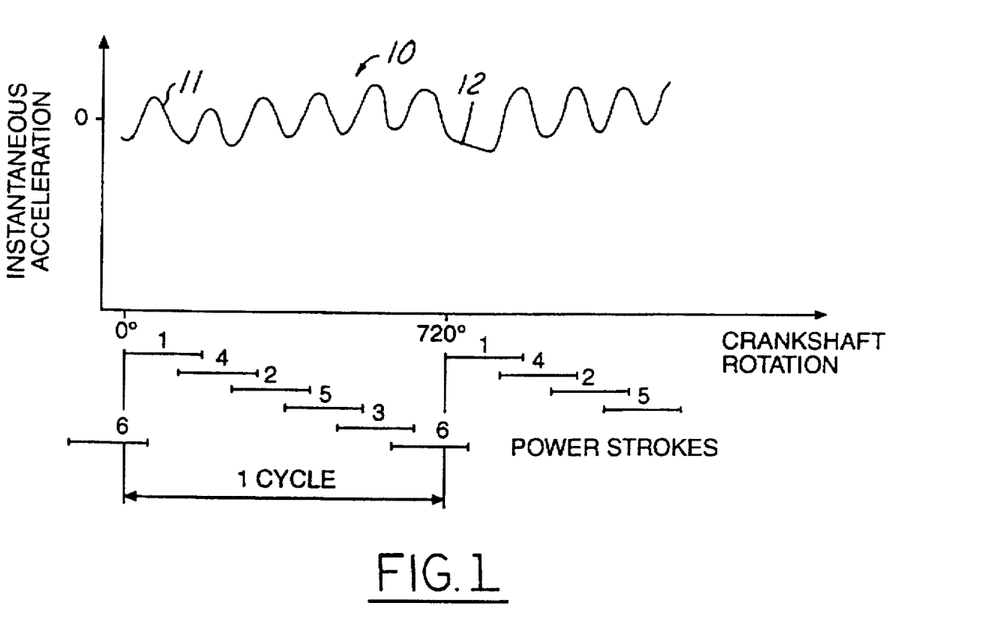
FIG. 1 is a plot showing instantaneous acceleration versus crankshaft rotation for both normal and misfiring cylinder events.

In the typical 4-stroke combustion engine, the four strokes include the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders, the power strokes of different cylinders will overlap. One engine cycle is comprised of 720° of crankshaft rotation during which each cylinder passes through each of its four strokes.

Curve 10 in FIG. 1 shows approximate acceleration fluctuation during engine operation. An acceleration peak 11 occurs during the firing interval of cylinder No. 1 and other maximums in the acceleration curve occur approximately corresponding to each other properly firing cylinder. When a misfire occurs such that no significant power is created by a cylinder during its firing interval, the crankshaft decelerates as indicated at 12.

Figure 2:
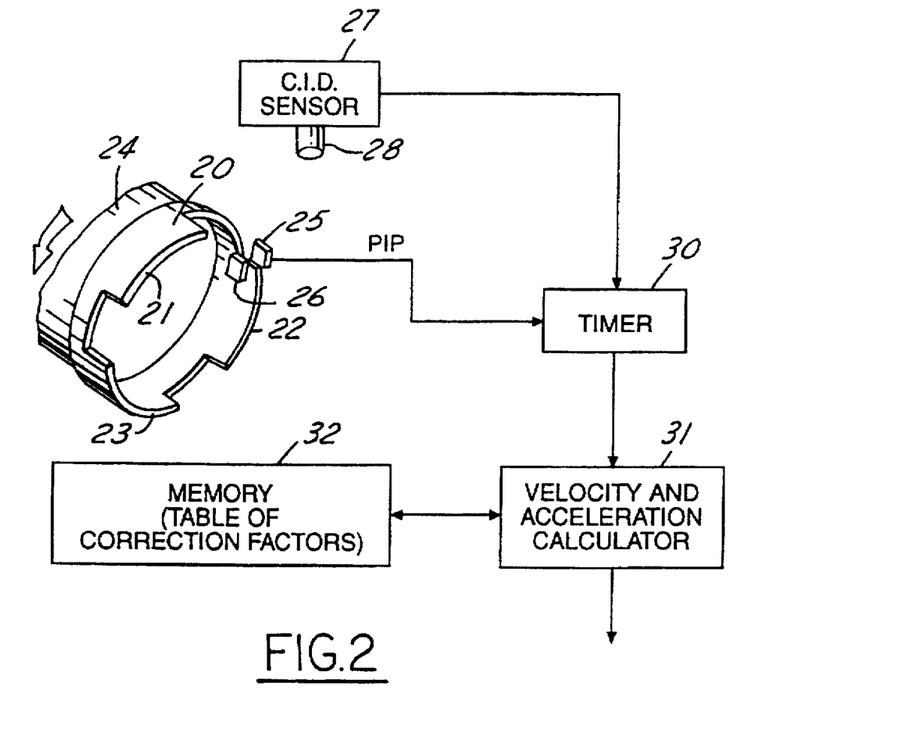
FIG. 2 is a schematic and block diagram showing measuring and calculating apparatus according to the present invention.

As described in the patents mentioned above, crankshaft based misfire detectors have advantageously employed measured rotation intervals occurring at a frequency of about once per cylinder firing rather than attempting to measure instantaneous values as shown in FIG. 1. FIG. 2 shows an apparatus for measuring velocity and obtaining corrected acceleration values according to the present invention. An engine rotation position sensing system includes a rotor 20 including vanes 21, 22, and 23 which rotate with a crankshaft 24 (a 3-vane rotor from a 6-cylinder engine is shown in this example). Vanes 21–23 pass between a hall-effect sensor 25 and a permanent magnet 26 to generate a profile ignition pulse (PIP) signal as crankshaft 24 rotates. Vanes 21–23 are arranged to generate a rising edge in the PIP signal at a predetermined position in relation to top dead center of each respective cylinder. The PIP signal actually indicates the approach to top dead center of two engine cylinders, one of which is approaching a power stroke and one of which is approaching an intake stroke since it takes two full crankshaft rotations to complete an engine cycle.

A cylinder identification (CID) sensor 27 is connected to a camshaft 28 for identifying which of the two cylinders is actually on its power stroke. Camshaft 28 rotates once for every two rotations of crankshaft 24. The resulting CID signal is preferably generated having a rising edge corresponding to the power stroke of cylinder No. 1. A timer 30 receives the PIP signal and the CID signal and measures elapsed time between predetermined engine position locations as determined by the PIP and CID signals. The elapsed time $\Delta T_i$ for each velocity measuring interval i is output from timer 30 to a velocity and acceleration calculator 31.

In a preferred embodiment, timer 30 and velocity and acceleration calculator 31 are implemented as part of a micro-controller with an associated memory 32 for storing correction factors, other data, and software instructions.

Figure 3:
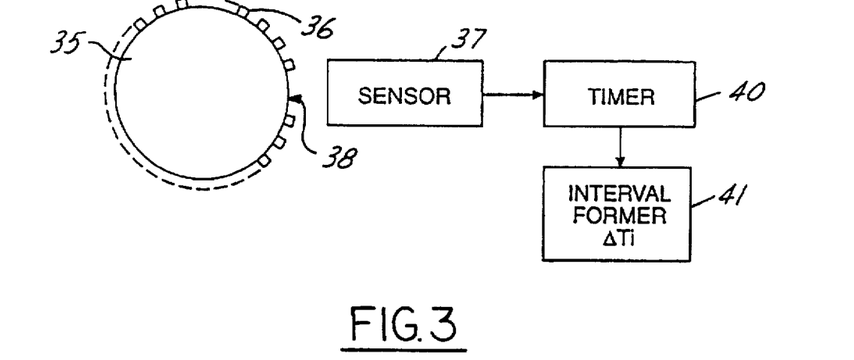
FIG. 3 shows an alternative embodiment for measuring apparatus.

An alternative embodiment of position sensing apparatus is shown in FIG. 3. A multi-toothed wheel 35 is mounted on an engine for rotation with the crankshaft. A plurality of teeth 36 are disposed along the periphery of wheel 35 at a predetermined angular spacing. Teeth 36 are preferably comprised of a metal or other magnetically permeable material. A variable reluctance sensor 37 is disposed in a fixed location closely spaced to teeth 36 for sensing the passage of teeth past sensor 37. A missing tooth location 38 is provided on wheel 35 to establish an absolute location reference, e.g. at 90° before top dead center of cylinder No. 1. A CID signal (not shown) would also be utilized to differentiate between the two halves of the engine cycle. CID sensors other than a camshaft sensor could alternatively be utilized to resolve the ambiguity between the power stroke and the intake stroke, such as sensors responsive to ignition coil current or voltage.

Sensor 37 is connected to a timer 40 and interval former 41 to produce rotation intervals $\Delta T_i$.

Multi-toothed wheel 35 shown in FIG. 3 could be mounted either at the front of an engine or at the rear near the flywheel. In fact, the flywheel itself can be used as a multi-toothed wheel since the periphery of a flywheel includes gear teeth for meshing with a starter motor. Sensor 37 can be mounted either at the front or rear of the engine depending upon the location of multi-toothed wheel 35.

Figure 4:
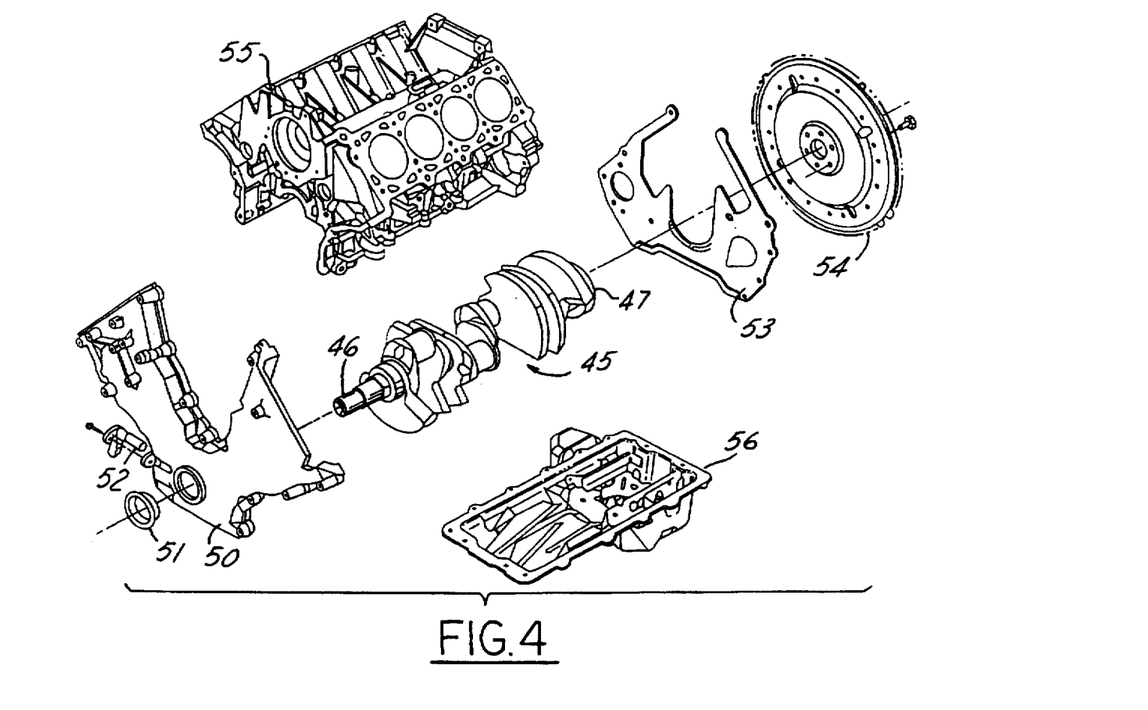
FIG. 4 is an exploded perspective view of portions of an engine including a crankshaft.

FIG. 4 shows a crankshaft 45 having a front end 46 and a back end 47. Front end 46 passes through a front engine plate 50 and has a toothed wheel 51 mounted thereto. A variable reluctance sensor 52 is mounted to front plate 50 for detecting rotation of toothed wheel 51. Back end 47 of crankshaft 45 passes through a rear engine plate 53 to a flywheel 54 that is mounted to back end 47. Crankshaft 45 is further enclosed within the engine which further includes a cylinder block assembly 55 and an oil pan assembly 56, for example.

Crankshaft 45 exhibits greater inertia at its rear end 47 due to the attachment of the massive flywheel 54. In contrast, the front end 46 of crankshaft 45 exhibits less inertia so that torsional oscillations are magnified at the front crankshaft section relative to the rear section of the crankshaft near the flywheel. Furthermore, the torsional vibrations are less periodic (i.e., exhibit a greater range of frequency) than oscillations at the flywheel.

Any torsional oscillations at the front of crankshaft 45 that are contained in data collected using crankshaft sensor 52 (i.e., at the front section of the crankshaft) can be alleviated using the correction factors disclosed in copending application Ser. No. 08/417,357, now U.S. Pat. No. 5,531,108. Even though the signal-to-noise ratio for accelerations as measured at the front of the engine are significantly improved, misfire detection capability may still be inadequate for difficult conditions such as simultaneous high engine speed and low engine load. Better misfire detection capability is obtained overall using a crankshaft position sensor mounted at the flywheel, although flywheel acceleration measurements still benefit from using the torsional correction factors provided in the copending application.

The present invention provides the misfire detection capability that would be obtained from crankshaft position measurements at the flywheel while only requiring actual measurements to be made at the front of the crankshaft.

Specifically, the invention employs a dynamic transformation that maps front-of-engine acceleration measurements to rear-of-engine accelerations. The transformation is a prediction of flywheel motion based on measurements taken at the front of the crankshaft. The relationship between these two quantities is nonlinear and therefore a nonlinear transform is preferably used.

The preferred embodiment of the present invention uses trainable neural networks to perform the nonlinear, dynamic transformation. Artificial neural networks are trained by representative data sequences that relate a system's outputs to its inputs. In the present invention, rear-of-engine crankshaft accelerations (as corrected by the adaptive torsional correction factors of the copending application) are predicted as a function of front-of-engine crankshaft accelerations (also as corrected according to the copending application) using dynamic (feedback) neural networks that have been trained with representative streams of input/output data.

Figure 5:
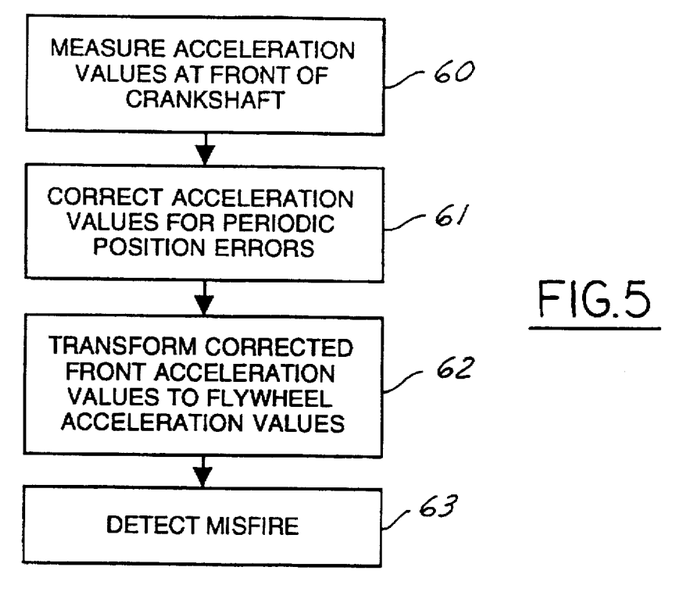
FIG. 5 is a flowchart showing a preferred method for transforming acceleration values.

Misfire detection in an in-use vehicle system proceeds according to the method shown in FIG. 5. In step 60, rotation quantities corresponding to individual cylinder events are measured at the front of the crankshaft (or at any section of the crankshaft remote from a damped section of the crankshaft). A preferred rotation quantity to be determined is acceleration. As used herein, the term "rotation quantity" refers to time measurements between predetermined crankshaft positions or any other determined quantity such as velocity or acceleration that can be used in the misfire detector.

In step 61, the measured rotation quantities, such as acceleration, are corrected for periodic position errors according to the method disclosed in copending application Ser. No. 08/417,357, now U.S. Pat. No. 5,531,108. In step 62, the corrected front acceleration values are transformed to flywheel acceleration values. The transform is nonlinear and preferably has been determined and recorded at a plurality of various engine operating conditions such as engine speed and load with and without known misfires introduced. Finally, in step 63, the flywheel acceleration values are used in the usual manner to detect misfire. Use of the transformed acceleration values increases misfire detection accuracy because torsional disturbances of the crankshaft are further reduced by the transformation.

Figure 6:
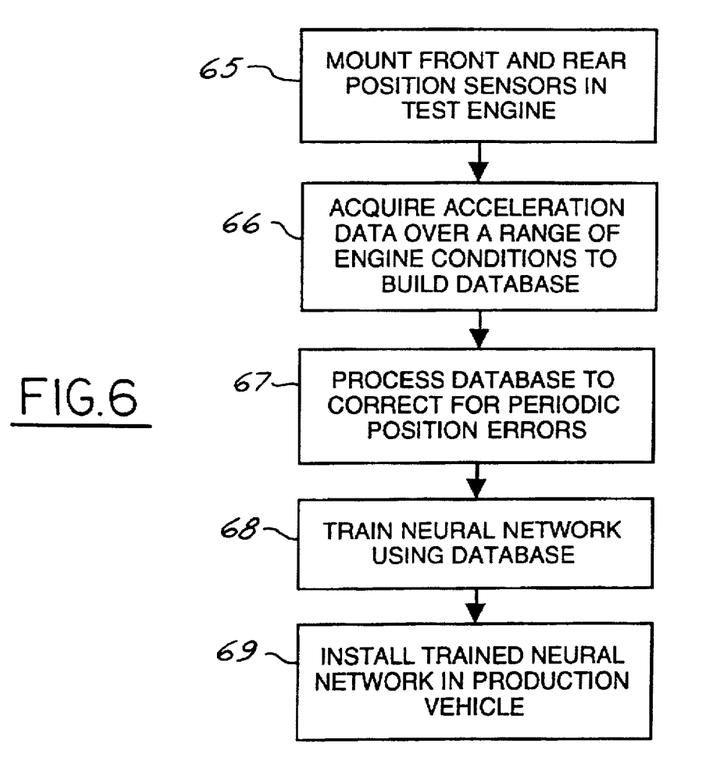
FIG. 6 is a flowchart showing the training process for the present invention.

The transform for a particular vehicle is derived using the method shown in FIG. 6. Any particular transform is valid for a single engine/powertrain design, although it is valid for each engine/powertrain built according to that design. To obtain a transform for a particular engine/powertrain design, front and rear position sensors are mounted in one or more test engines having that particular design in step 65. In step 66, the engine or engines are operated over a range of engine conditions (e.g., engine speed and load between respective maxima and minima with and without misfires occurring) to build a database of acceleration data from both position sensors. The gathered acceleration data is corrected for periodic position errors in step 67 according to the correction method described in copending application Ser. No. (94-0356).

In step 68, a neural network is trained using the database of corrected acceleration data. Position information from the front sensor and data identifying the engine operation such as engine speed and load are provided to the neural network as inputs while the rear position data is presented as the correct output to be associated with those inputs. The trained neural network learns to predict the rear position data based on the front position data and the engine operating conditions. In step 69, the trained neural network is installed in a production vehicle where it will then transform front acceleration values to flywheel acceleration values as in FIG. 5.

Figure 7:
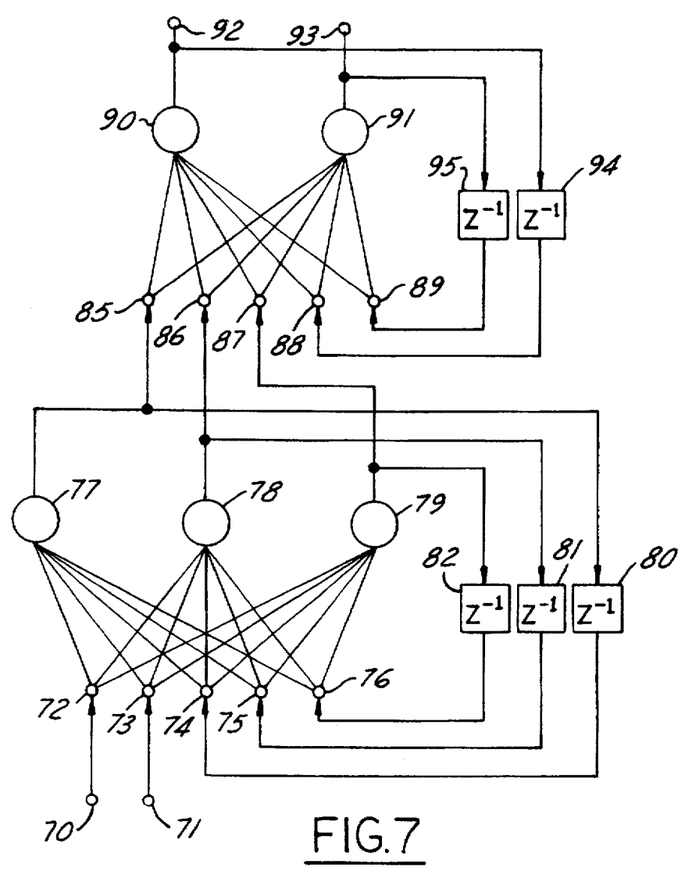
FIG. 7 is a schematic diagram showing a generic architecture for constructing a neural network.

FIG. 7 shows a generic neural network architecture of the type that is useful in the present invention. The architecture includes a pair of inputs 70 and 71 and a pair of outputs 92 and 93. Input signals from inputs 70 and 71 are coupled to distribution points 72 and 73 from where they are distributed to each node or processing element in a first input layer including nodes 77, 78, and 79. The outputs of nodes 77–79 are fed back to the inputs of nodes 77–79 through unit delay blocks 80, 81, and 82 and distribution points 74, 75, and 76. The outputs of nodes 77–79 are further input to an output layer of nodes 90 and 91 through distribution points 85–87. The output layer further includes feedback through unit delay blocks 94 and 95 and distribution points 88 and 89. By adjusting values for weights connected to each node or processing element, the neural network learns to associate particular values of inputs with particular values of outputs. By virtue of feedback through the unit delay blocks, this neural network architecture is well suited for representing and processing sequential or dynamical and nonlinear behaviors, such as a crankshaft torsional acceleration transformation function. The architecture of FIG. 7 is easily modified to accommodate other numbers of inputs and outputs, layers, nodes, and weights.

Figure 8:
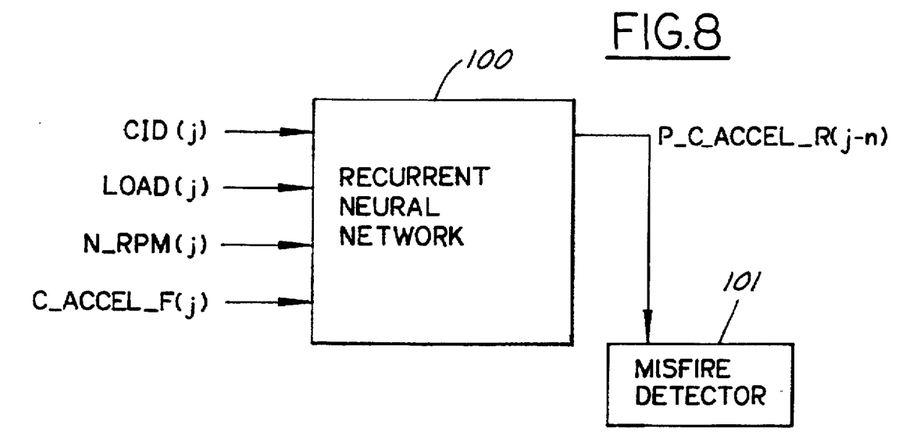
FIG. 8 is a block diagram showing inputs and outputs to a neural network that implements the present invention.

In a preferred embodiment as shown in FIG. 8, a recurrent neural network 100 utilizes four inputs and one output to perform the nonlinear transformation between front and rear crankshaft acceleration measurements. FIG. 8 shows a trained network that is installed in a vehicle and includes the coefficients or weights determined during training. The four inputs to the neural network for each individual cylinder firing $n_i$ (where i is an index variable designating the $i^{th}$ event), include $CID(n_i)$, $LOAD(n_i)$, $N\_RPM(n_i)$, and $C\_ACCEL\_F(n_i)$. $CID(n_i)$ represents cylinder acceleration measurements corresponding to cylinder No. 1, such that $CID(n_i)$ is set equal to 1 for that one cylinder acceleration measurement during each engine cycle and is zero otherwise. $LOAD(n_i)$ represents instantaneous engine load. $N\_RPM(n_i)$ represents instantaneous engine speed. $C\_ACCEL\_F(n_i)$ represents corrected acceleration measured at the front of the crankshaft as corrected using the correction factors described in copending application Ser. No. 08/417,357, now U.S. Pat. No. 5,531,108. The single output from neural network 100 is denoted by $P\_C\_ACCEL\_R(n_{i-N})$ for representing predicted corrected acceleration at the rear of the crankshaft for a cylinder event $n_{i-N}$ (i.e., the firing of the same cylinder but in the previous engine cycle). Thus, the neural network actually predicts the corrected acceleration at the rear of the crankshaft delayed by one engine cycle (there being "N" cylinders in the engine). The corrected predicted accelerations at the rear of the crankshaft are provided to a misfire detector 101 for performing misfire detection according to the methods previously mentioned.

In this preferred embodiment, a network architecture was employed having four inputs, a first layer of fifteen recurrent nodes, a second layer of seven recurrent nodes, and one linear output.

In training the neural network to operate as shown in FIG. 8, a preferred training algorithm is based on the multi-stream decoupled extended Kalman filter algorithm as described in Puskorius and Feldkamp, *Neurocontrol of Nonlinear Dynamical Systems with Kalman Filter Trained Recurrent Networks*, IEEE Trans. on Neural Networks, Vol. 5, No. 2 (March 1994), although in principle any gradient-based neural network training algorithm can be used.

After neural network coefficients or weights for each node or processing element are obtained from training, the coefficient values are replicated in each neural network to be installed on a vehicle having the particular engine/powertrain combination. In operation on each vehicle, crankshaft rotation intervals are measured at the front of the crankshaft and successive intervals are used to determine acceleration corresponding to each respective cylinder event. The acceleration values are corrected as described in copending application Ser. No. 08/417,357, now U.S. Pat. No. 5,531,108. Engine speed and load are obtained from the electronic engine control (not shown) that controls the engine. The identity of a particular cylinder firing is also obtained from the electronic engine control. This data is formatted into an input vector to be provided to the neural network. The value of $CID(n_i)$ synchronizes the operation of the neural network to specific cylinder events. $LOAD(n_i)$ and $N\_RPM(n_i)$ identify the engine operating condition within the dynamic range of engine conditions for which the transformation between front and rear of the crankshaft needs to be made. The final component in the input vector to the neural network is the corrected front acceleration of the crankshaft $C\_ACCEL\_F(n_i)$. The input vector propagates through the dynamic neural network to predict rear of engine corrected acceleration for the current cylinder from a previous engine cycle denoted as $P\_C\_ACCEL\_R(n_{i-N})$. The resulting accelerations are median filtered, compared with expected engine torque, and compared with a threshold to produce a misfire call in misfire detector 101.

Figure 9A:
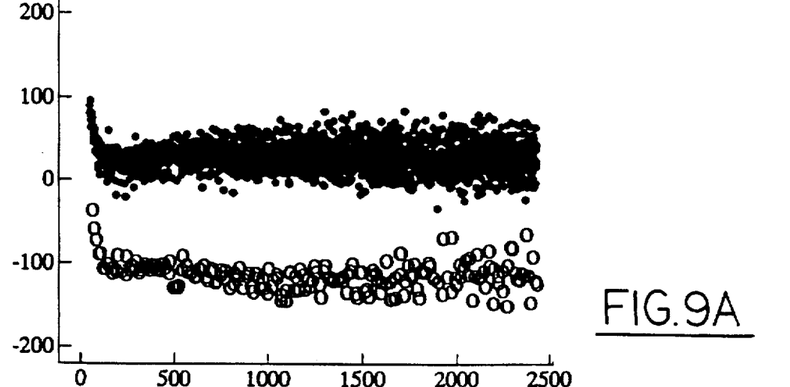
Figure 9B:
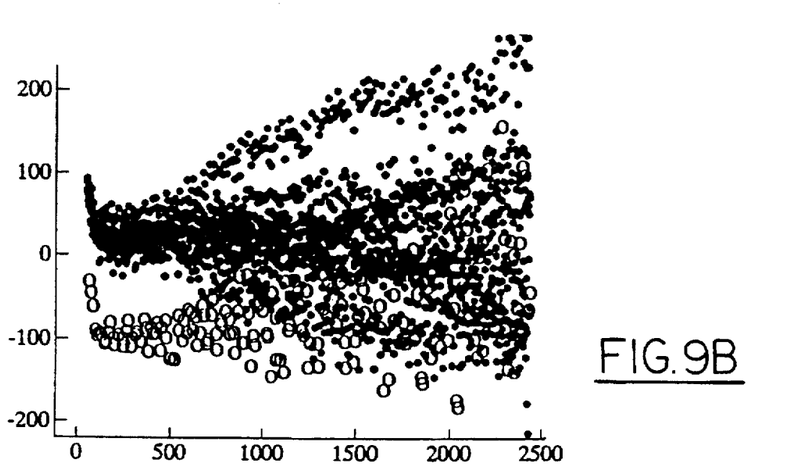

FIGS. 9A to 12B illustrate the improved misfire detection capability achieved using the present invention. FIGS. 9A to 12B show acceleration data over variable speeds at medium loads and show instances of misfire induced at misfire rates of 1 in 25 and 1 in 23 known misfires. Open circles in the Figures illustrate a data point showing an acceleration value made at a cylinder event with an intentionally introduced misfire. Filled dots in the Figures show acceleration measurements corresponding to properly firing cylinder events. FIG. 9A illustrates raw acceleration measurements obtained using a crankshaft position signal from the flywheel or damped section of the crankshaft where torsional oscillations are reduced. FIG. 9B illustrates raw acceleration measurements taken at the front of the crankshaft where torsional oscillations are magnified. It is readily seen that the ability to distinguish between misfiring cylinders and properly firing cylinders is blurred in FIG. 9B as compared to FIG. 9A. This blurring is especially pronounced in the right half of the plots where engine speed was increased.

Figure 10A:
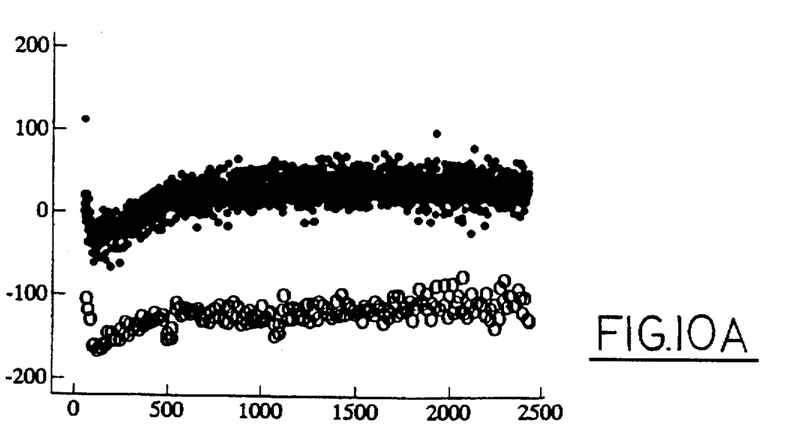
Figure 10B:
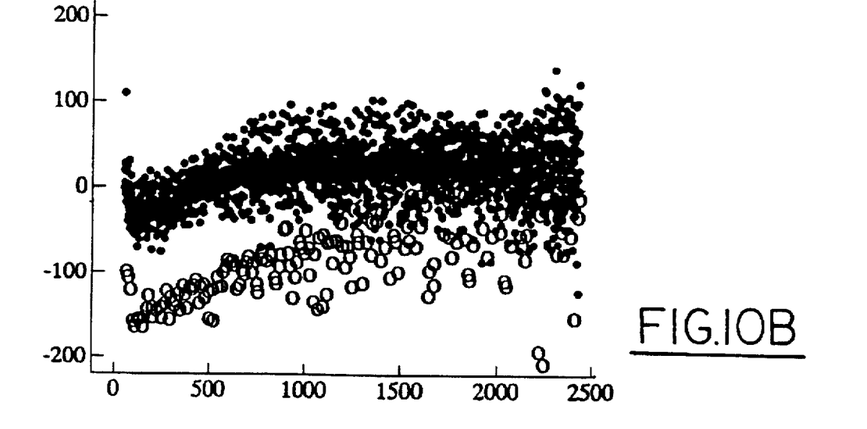
Figure 11A:
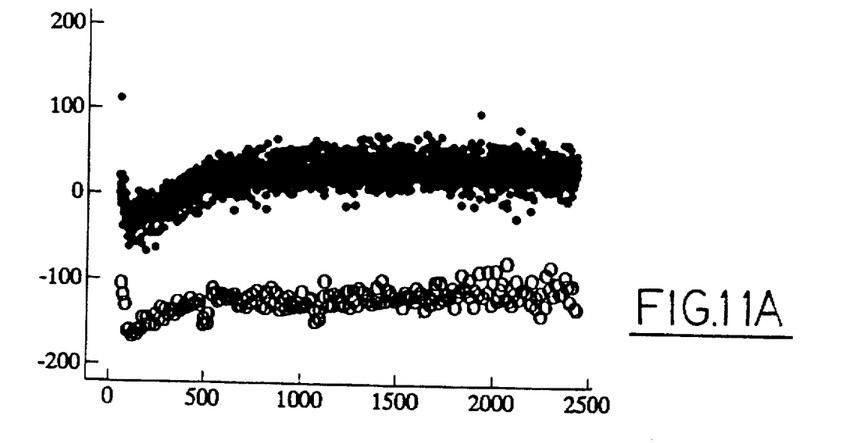
Figure 11B:
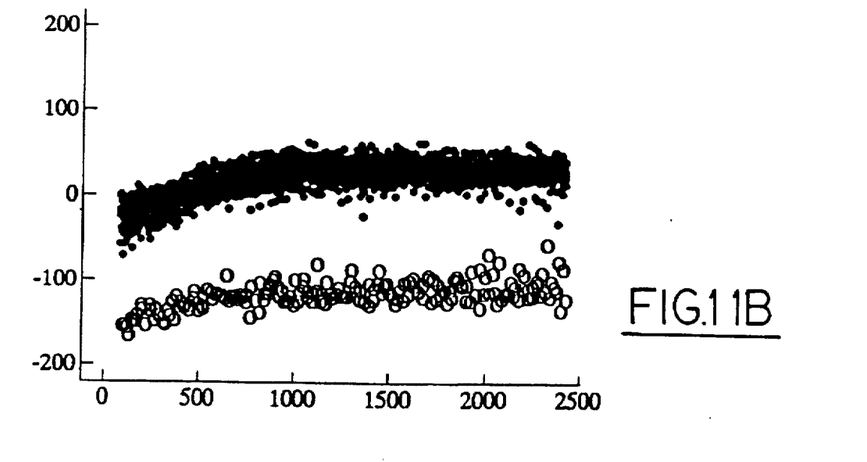

FIG. 10A illustrates a plot of corrected acceleration measurements obtained by applying correction factors of the copending application to the raw acceleration values in FIG. 9A. The separation between misfires and proper firings is improved over the data of FIG. 9A. FIG. 10B shows corrected acceleration measurements obtained by applying correction factors to the raw acceleration measurements at the front of the crankshaft shown in FIG. 9B. Although improvement is made in separating the two types of events, it can be seen that there remain speed and load conditions at which the corrected acceleration measurements from the front of the crankshaft still cannot provide accurate misfire detection. However, by applying the neural network transformation of the present invention to the data shown in FIG. 10B, a predicted corrected acceleration at the rear of the crankshaft is obtained as shown in FIG. 11B. FIG. 11B demonstrates greatly improved misfire detection capability and shows that the neural network transformation accurately predicts the measured corrected acceleration at the rear of the crankshaft which is shown in FIG. 11A (FIGS. 11A shows data identical to FIG. 10A).

Figure 12A:
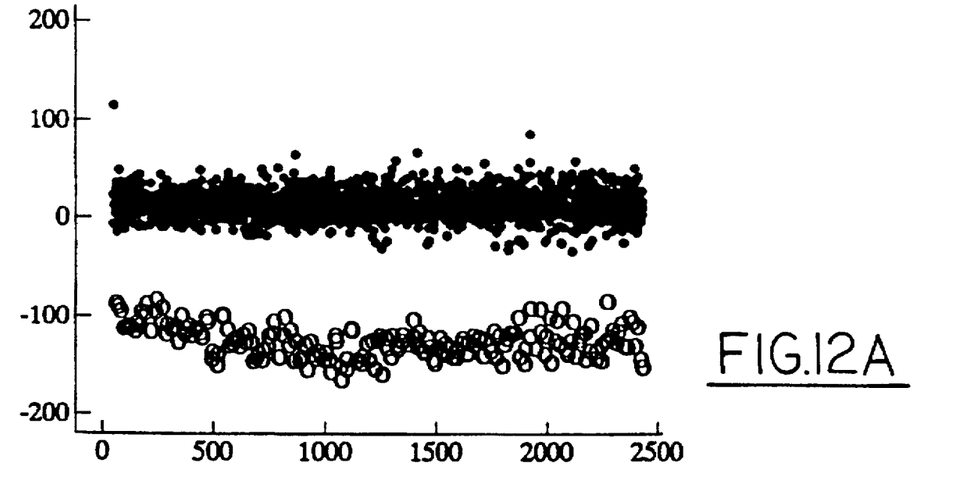
Figure 12B:
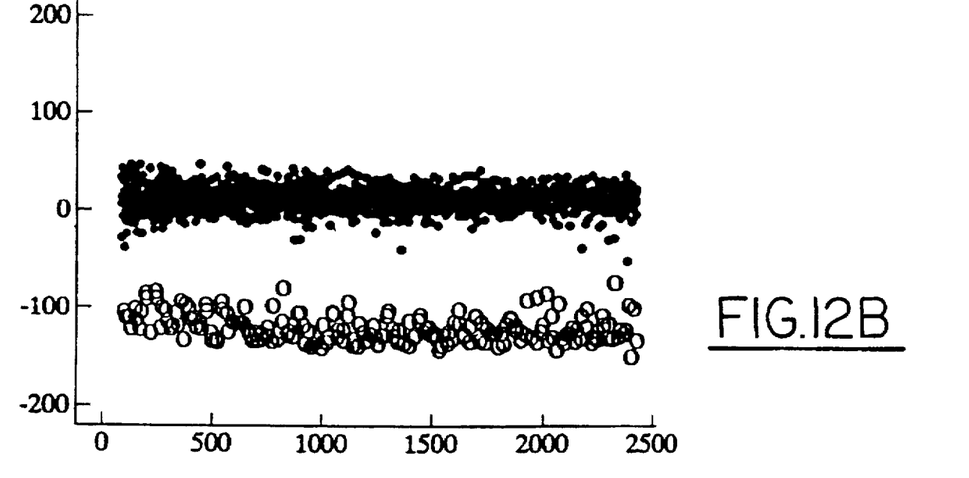

In the typical process of detecting misfire, the acceleration values are median filtered to remove the effects of overall engine acceleration. FIG. 12A illustrates corrected acceleration values from the rear flywheel crankshaft sensor after median filtering. It is relatively straight forward to provide a threshold comparison to distinguish each event as a misfire or a proper firing. In FIG. 12B, the predicted accelerations based on measurements from the front crankshaft position sensor have been median filtered. The resulting values provide excellent misfire detection capability with the ability to identify events using a threshold.

What is claimed is:

1. A method for obtaining corrected rotation quantities in a misfire detector for an internal combustion engine, said engine having a crankshaft with a first crankshaft section being damped with respect to torsional oscillations, said engine further having a crankshaft position sensor generating position signals at predetermined rotational positions of said crankshaft, said crankshaft position sensor being juxtaposed with a second crankshaft section where torsional oscillations have a greater magnitude than at said first crankshaft section, said method comprising the steps of:

measuring rotation quantities corresponding to individual cylinder events during operation of said engine;

correcting said measured rotation quantities to remove periodic position irregularities;

applying a nonlinear transform to said corrected measured rotation quantities to estimate acceleration values occurring at said first crankshaft section; and detecting misfire using said estimated rotation quantities.

2. The method of claim 1 wherein said rotation quantities are comprised of acceleration between successive rotation intervals of said crankshaft.

3. The method of claim 1 wherein said nonlinear transform is comprised of a neural network.

4. Engine apparatus for detecting misfires comprising:

a crankshaft with a first crankshaft section being damped with respect to torsional oscillations created during engine rotation;

a crankshaft position sensor generating position signals at predetermined rotational positions of said crankshaft, said crankshaft position sensor being juxtaposed with a second crankshaft section where torsional oscillations have a greater magnitude than at said first crankshaft section;

a timer coupled to said crankshaft position sensor measuring rotation intervals corresponding to individual cylinder events during engine rotation;

a processor coupled to said timer generating rotation quantities corrected for periodic position irregularities in said measured rotation intervals;

a transformer coupled to said processor estimating said corrected rotation quantities occurring at said first crankshaft section; and a misfire detector coupled to said transformer for detecting misfires of said individual cylinder events in response to said estimated corrected rotation quantities.

5. The engine apparatus of claim 4 wherein a flywheel is mounted at said first crankshaft section.

6. The engine apparatus of claim 4 further comprising an engine assembly, wherein said first crankshaft section is disposed at a first end of said engine assembly and has a flywheel mounted thereto, and wherein said crankshaft position sensor includes an encoder wheel mounted at said second crankshaft section which is disposed at a second end of said engine assembly.

7. The engine apparatus of claim 4 wherein said transformer is comprised of a neural network having a predetermined configuration determined in a training procedure to model a nonlinear transformation relating the position of said second crankshaft section to the position of said first crankshaft section.

8. The engine apparatus of claim 4 wherein said rotation quantities are comprised of crankshaft acceleration.

* * * * *